May 28, 1963   C. J. BRASEFIELD   3,091,069
APPARATUS AND METHOD FOR PRODUCTION OF CARBON BLACK
Filed Jan. 14, 1960

Charles J. Brasefield,
Inventor.
Koenig and Pope,
Attorneys.

United States Patent Office 3,091,069
Patented May 28, 1963

3,091,069
APPARATUS AND METHOD FOR PRODUCTION
OF CARBON BLACK
Charles J. Brasefield, Carbondale, Ill., assignor, by mesne assignments, to Research Corporation, New York, N.Y., a corporation of New York
Filed Jan. 14, 1960, Ser. No. 2,495
6 Claims. (Cl. 55—5)

This invention relates to methods, apparatus and systems for producing carbon black, and more particularly, to improved methods and apparatus for agglomerating carbon black particles in the effluent smoke from carbon black producing furnaces.

Among the several objects of the invention may be noted the provision of an improved method and system for agglomerating carbon black particles; the provision of such a method in accordance with which the magnitude and sign of the electrical charge imparted to carbon black particles may be controlled; the provision of a method of this character in which the size of the carbon black agglomerates obtained may be controlled; and the provision of a method of this type which is simple and economical to operate. Other objects and features will be in part apparent and in part pointed out hereinafter.

The invention accordingly comprises the constructions and methods hereinafter described, the scope of the invention being indicated in the following claims.

Figure 1:
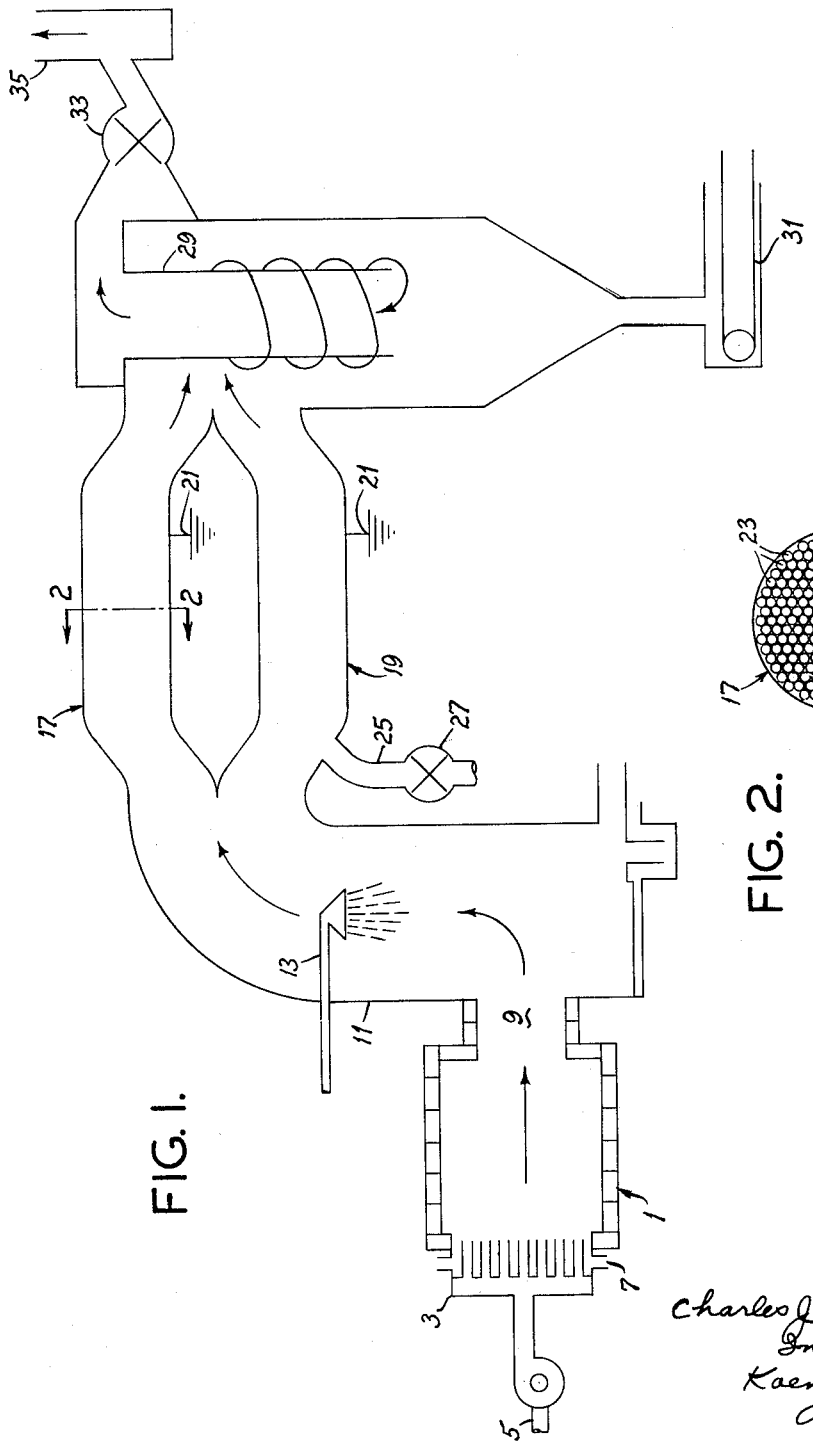
Figure 2:
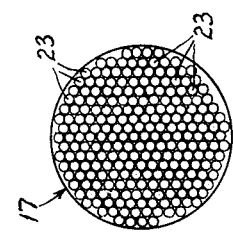

In the accompanying drawings, in which one of various possible embodiments of the invention is illustrated, FIG. 1 is a diagram illustrating one embodiment of the method of the invention; and, FIG. 2 is an enlarged vertical section taken on line 2—2 of FIG. 1.

Corresponding reference characters indicate corresponding parts throughout the several views of the drawings.

Various methods, systems and apparatus have been proposed and used for removing carbon black particles from the effluent gases emanating from carbon black producing furnaces. The most widely used of these involve the use of electrostatic fields, produced by high voltages, for imparting a charge to the carbon black particles which are then thoroughly mixed to produce agglomerates of the carbon black. The agglomeration of carbon black particles in this manner is not only expensive, but moreover, does not make it possible to control the magnitude of the charge imparted to the carbon black particles or in turn, the size of the agglomerates produced.

The present invention provides a method and apparatus whereby the carbon black particles in the effluent gases from carbon black producing furnaces may be readily and less expensively agglomerated without the use of high voltages and in a manner which permits the magnitude and sign of the charge imparted to the carbon black particles as well as the size of the agglomerates obtained to be controlled. The basis for the present invention resides in my finding that carbon black particles become electrified by contact with the surfaces of various materials and, dependent upon the relative work functions of the carbon black and the material, acquire either a positive or negative charge. As is known, the work function of a material is a measure of its electron affinity or the energy required to remove an electron from the material. Thus, materials having a high work function have a greater electron affinity than materials having a low work function. In accordance with the present invention, I have found that carbon black particles such as those in the effluent gases coming from carbon black producing furnaces, upon contact with a material having a higher work function than the carbon black, give up an electron or electrons and acquire a positive charge. On the other hand, upon contact with a material such as aluminum having a lower work function than the carbon black, the particles of carbon black take on an electron or electrons and acquire a negative charge.

Because of these properties of carbon black, I have found that carbon black particles in the effluent smoke from carbon black producing furnaces may be more simply and efficiently agglomerated. This is accomplished through the present invention by first dividing the effluent smoke from a carbon black producing furnace into two streams or alternatively, by taking two separate streams of effluent smoke from two separate carbon black producing furnaces or two groups of such furnaces, and thereafter contacting the carbon black particles in one stream with a material having a higher work function than the carbon black to impart a positive charge thereto and the carbon black particles in the other stream with a material having a lower work function than the carbon black to impart a negative charge thereto. The oppositely charged carbon black particles from the two streams are then thoroughly mixed together as, for example, in a cyclone collector. The electrostatic attraction between the oppositely charged particles produces aggregates which fall into the bottom of the collector where they may then be carried away by conventional conveyors.

The size of the aggregates or agglomerates produced is dependent upon the relative magnitude of the positive and negative charges imparted to the carbon black particles in the two streams. If, for example, the positive and negative charges are of equal magnitude, small agglomerates are produced. If, however, conditions are adjusted so that the positive charge imparted to the carbon black particles in one stream is of much greater magnitude than the negative charge imparted to the carbon black particles in the other stream (or vice versa), then larger agglomerates are produced since a number of carbon particles with a small negative charge may cling to one particle with a larger positive charge (or vice versa).

The magnitude and sign of the charge acquired by the carbon black particles will vary according to the relative work functions of the carbon black and the material with which it is contacted. According to the present invention, the magnitude of the charge may be controlled by selecting materials having appropriate work functions which, when contacted by carbon black particles will impart a charge of the desired sign and magnitude, or by controlling the work function of the carbon black particles relative to the work function of the materials with which the particles are to be contacted, or both. For example, carbon black particles produced by the furnace combustion process acquire a positive charge upon contacting a surface of oxidized nickel, and acquire a negative charge upon contacting a surface of aluminum. This is because the work function of oxidized nickel is higher than that of the carbon black particles whereas the work function of aluminum is lower than that of the carbon black particles. Depending upon the work function of the carbon black, the magnitude of the positive and negative charges so imparted may be of the same order or one may be greater than the other.

I have also found that the work function of carbon black is dependent upon its oxygen content i.e., the work function of carbon black may be increased by increasing its oxygen content. Carbon black of low oxygen content thus has a low work function and upon contacting a material having a high work function such as oxidized nickel, for example, acquires a positive charge. However, upon increasing its oxygen content, its work function may be increased sufficiently so that it acquires a negative charge upon contacting the same material. Thus, carbon black sold under the trade designation "Sterling MT" (marketed by Godfrey L. Cabot, Inc.) and having an oxygen content of approximately 0.25% was found to acquire a positive charge of approximately 1.0 per unit mass (as measured by a Keithley electrometer) upon being contacted with nickel (having an oxidized surface); carbon black sold under the trade designation "Gastex" (marketed by Godfrey L. Cabot, Inc.) and having an oxygen content of approximately 0.4% acquired a positive charge of approximately 1.05 per unit mass upon being contacted with nickel; carbon black sold under the trade designation "Elf 4" (marketed by Godfrey L. Cabot, Inc.) and having an oxygen content of approximately 3.25% acquired a positive charge of approximately 0.3 per unit mass upon being contacted with nickel; carbon black sold under the trade designation "Elf 0" (marketed by Godfrey L. Cabot, Inc.) and having an oxygen content of approximately 5% acquired a negative charge of approximately 0.3 per unit mass upon being contacted with nickel; carbon black sold under the trade designation "Mogul A" (marketed by Godfrey L. Cabot, Inc.) and having an oxygen content of approximately 7.5% acquired a negative charge of approximately 0.7 per unit mass upon being contacted with nickel; and carbon black sold under the trade designation "Carbolac 1" (marketed by Godfrey L. Cabot, Inc.) and having an oxygen content of approximately 11.6% acquired a negative charge of approximately 1.65 per unit mass upon being contacted with nickel. Accordingly, by adjusting the oxygen content of the carbon black it is possible to obtain particles whose charge is either positive or negative, the magnitude of the charge being controllable, within limits depending in part on the work function of the material which the particles contact.

The oxygen content and thus the work function of carbon black may be increased, for example, by adding air to the carbon black effluent gas from a furnace at a point where the temperature of the gas is approximately 400° C.–600° C. The oxidation may not be permanent if the temperature reaches only 400° C., but is permanent at higher temperatures. If the agglomeration of the carbon black particles is to be carried out at room temperature, oxidation of the carbon black should be carried out above 400° C. so as to be permanent. It will be understood that other methods of oxidizing carbon black may also be employed.

From the foregoing, it will be apparent that the magnitude and sign of the charge imparted to carbon black particles in accordance with the present invention may be controlled by selecting a material of appropriate work function with which the carbon is to be contacted and/or by controlling the work function of the carbon black through adjustment of its oxygen content. Also, the size of the carbon black agglomerates obtained may be controlled by controlling the magnitude of the positive and negative charges imparted to the carbon black.

Referring now to the drawings, the invention is shown as applied to carbon black particles in the effluent smoke produced by the conventional furnace combustion process. A conventional furnace generally designated 1 is shown as having a burner 3, an air inlet 5 and a gas inlet 7. The flue gases formed in the furnace consist primarily of carbon monoxide, nitrogen, hydrogen and water vapor, and carry the suspended carbon black particles from the furnace 1 through outlet 9 to a cooling tower 11 where water spray 13 reduces the temperature of the flue gases to approximately 400° C. or any desired temperature.

As shown, the cooled flue gases pass up the cooling tower and are then divided into two streams, one of which passes through a conduit generally designated 17 and the other of which passes through a conduit generally designated 19, each of the conduits being grounded as indicated at 21. Conduit 17 has disposed therein a plurality of cylinders 23 made of a metal having an appropriate work function as previously described. Conduit 19 likewise has disposed therein a plurality of cylinders (not shown) of a metal of appropriate work function. For example, cylinders 23 in conduit 17 may be composed of nickel, while the cylinders in conduit 19 may be composed of aluminum or stainless steel. The diameter and length of the cylinders in conduits 17 and 19 is such as to provide a large surface area and insure contact of substantially all carbon black particles with the surface of one of the cylinders as they pass through conduits 17 and 19.

The carbon black particles in the effluent smoke passing through cylinders 23 of conduit 17 contact the surfaces of these cylinders which are composed of a material having a higher work function than the carbon black and thereby acquire a positive charge. On the other hand, the carbon black particles passing through the cylinders of conduit 19 contact the surfaces of these cylinders, which are made of a material having a lower work function than the carbon black, and thereby acquire a negative charge. At 25 is indicated an inlet to conduit 19, having a valve 27 therein for opening and closing the inlet. Carbon black produced by the furnace combustion process normally has an average oxygen content of 1–2% by weight. If desired, air may be admitted to conduit 19 through inlet 25 and the temperature of the effluent smoke regulated so as to increase the oxygen content of the carbon black. This increases the work function of the carbon black. The negative charge acquired by the carbon black particles passing through the cylinders in conduit 19 is consequently also increased.

The positively charged carbon black particles leaving conduit 17 and the negatively charged carbon black particles leaving conduit 19 are thoroughly mixed in a conventional cyclone collector 29. The particles are then formed into agglomerates by the electrostatic attraction between the oppositely charged particles and the agglomerates thus produced fall to the bottom of the cyclone collector 29 and are carried away by a conventional conveyor 31. Exhaust gases pass up through cyclone collector 29 and out of the system through blower 33 and stack 35.

A bypass valve (not shown) may be provided at the entrance to conduits 17 and 19 to regulate the volume of smoke flowing through each of these conduits so that the relative flow of smoke through each conduit will be inversely proportional to the charge acquired per particle in each of the conduits. Thus, the valve may be adjusted so that there are five times as many carbon black particles having negative charges as there are particles having positive charges exiting from conduits 17 and 19, the magnitude of each negative charge being one-fifth that of each positive charge.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. The method of agglomerating carbon black particles in the effluent smoke from carbon black furnaces and separating said carbon black particles from substantially all of the gaseous portion of said smoke, comprising dividing the smoke into two streams, passing one stream through a conduit wherein the carbon black particles in said one stream come into contact with first metallic surfaces having a higher work function than the carbon black particles thereby to impart a positive charge to the carbon black particles and a negative charge to the metallic surfaces and continuously drawing off the negative charges from said metallic surfaces so as to avoid accumulation of negative surface charges on said first metallic surfaces, the magnitude of the positive charge acquired by said carbon black particles in said one stream being dependent upon the relative work functions of said first metallic surfaces and said carbon black particles, passing the other stream through a conduit wherein the carbon black particles in said other stream come into contact with second metallic surfaces having a lower work function than the carbon black particles thereby to impart a negative charge to the carbon black particles and a positive charge to the metallic surfaces and continuously drawing off the positive charges from said metallic surfaces so as to avoid accumulation of positive surface charges on said second metallic surfaces, the magnitude of the negative charges acquired by said carbon black particles in said other stream being dependent upon the relative work functions of said second metallic surfaces and said carbon black particles, and thereafter mixing the two streams together to effect agglomeration of carbon black particles from the one stream with carbon black particles from the other stream with the size of the resulting agglomerates being dependent upon the magnitude of the charges carried by the respective particles from the two streams.

2. The method of agglomerating carbon black particles in the effluent smoke from carbon black furnaces and separating said carbon black particles from substantially all of the gaseous portion of said smoke, comprising dividing the smoke into two streams, passing one stream through a conduit wherein the carbon black particles in said one stream come into contact with first metallic surfaces having a higher work function than the carbon black particles thereby to impart a positive charge to the carbon black particles and a negative charge to the metallic surfaces and continuously drawing off the negative charges from said metallic surfaces so as to avoid accumulation of negative surface charges on said metallic surfaces, the magnitude of the positive charge acquired by said particles in said one stream being dependent upon the relative work functions of said first metallic surfaces and said carbon black particles, increasing the oxygen content of carbon black particles in the other stream, passing said other stream through a conduit wherein the carbon black particles in said other stream come into contact with second metallic surfaces having a lower work function than the carbon black particles thereby imparting a negative charge to the carbon black particles and a positive charge to the metallic surfaces and continuously drawing off the positive charges from said second metallic surfaces so as to avoid accumulation of positive surface charges on said second metallic surfaces, the magnitude of the negative charge acquired by said carbon black particles in said other stream being dependent upon the relative work functions of said second metallic surfaces and said carbon black particles, and thereafter mixing the two streams together to effect agglomeration of carbon black particles from the one stream with carbon black particles from the other stream with the size of the resulting agglomerates being dependent upon the magnitude of the charges carried by the respective particles from the two streams.

3. The method of agglomerating carbon black particles in the effluent smoke from carbon black furnaces and separating said carbon black particles from substantially all of the gaseous portion of said smoke, comprising dividing the smoke into two streams, passing one stream through a conduit of nickel wherein the carbon black particles in said one stream come into contact with nickel surfaces thereby to impart a positive charge to the carbon black particles and a negative charge to the nickel surfaces and continuously drawing off the negative charges from said nickel surfaces so as to avoid accumulation of negative surface charges thereon, the magnitude of the positive charge acquired by said carbon black particles in said one stream being dependent upon the relative work functions of said nickel surfaces and said carbon black particles, passing the other stream through a conduit of aluminum wherein the carbon black particles in said other stream come into contact with aluminum surfaces thereby to impart a negative charge to the carbon black particles and a positive charge to the aluminum surfaces and continuously drawing off the positive charges from said aluminum surfaces so as to avoid accumulation of positive surface charges thereon, the magnitude of the negative charges acquired by said carbon black particles in said other stream being dependent upon the relative work functions of said aluminum surfaces and said carbon black particles, and thereafter mixing the two streams together to effect agglomeration of carbon black particles from the one stream with carbon black particles from the other stream with the size of the resulting agglomerates being dependent upon the magnitude of the charges carried by the respective particles from the two streams.

4. The method of agglomerating carbon black particles in the effluent smoke from carbon black furnaces and separating said carbon black particles from substantially all of the gaseous portion of said smoke, comprising dividing the smoke into two streams, passing one stream through a conduit of nickel wherein the carbon black particles in said one stream come into contact with nickel surfaces thereby to impart a positive charge to the carbon black particles and a negative charge to the nickel surfaces and continuously drawing off the negative charges from said nickel surfaces so as to avoid accumulation of negative surface charges thereon, the magnitude of the positive charge acquired by said carbon black particles in said one stream being dependent upon the relative work functions of said nickel surfaces and said carbon black particles, passing the other stream through a conduit of stainless steel wherein the carbon black particles in said other stream come into contact with stainless steel surfaces thereby to impart a negative charge to the carbon black particles and a positive charge to the stainless steel surfaces and continuously drawing off the positive charges from said stainless steel surfaces so as to avoid accumulation of positive surface charges thereon, the magnitude of the negative charges acquired by said carbon black particles in said other stream being dependent upon the relative work functions of said stainless steel surfaces and said carbon black particles, and thereafter mixing the two streams together to effect agglomeration of carbon black particles from the one stream with carbon black particles from the other stream with the size of the resulting agglomerates being dependent upon the magnitude of the charges carried by the respective particles from the two streams.

5. A carbon black production, agglomeration and collection system comprising in combination a carbon black furnace, a first conduit connected to the outlet of said carbon black furnace to receive therefrom effluent smoke containing carbon black particles, a pair of conduits connected to said first conduit for receiving said smoke from said first conduit, the first of said pair of conduits having a plurality of metallic surfaces with a higher work function than the carbon black particles passed in contact therewith whereby a positive charge is imparted to said carbon black particles and a negative charge is imparted to said metallic surfaces, said first of the pair of conduits being electrically grounded whereby the negative charges on said metallic surfaces are continuously drawn off to avoid accumulation of said negative charges on said metallic surfaces, the second of said pair of conduits having a plurality of metallic surfaces with a lower work function than the carbon black particles passed in contact therewith whereby a negative charge is imparted to said carbon black particles and a positive charge is imparted to said metallic surfaces, said second of the pair of conduits being electrically grounded whereby the positive charges on said metallic surfaces are continuously drawn off to avoid accumulation of said positive charges on said metallic surfaces, and means for receiving and mixing the effluent smoke from said pair of conduits to agglomerate the carbon black particles therein with the size of the resulting agglomerates being dependent upon the magnitude of the charges carried by the respective carbon black particles from said pair of conduits.

6. A carbon black production, agglomeration and collection system comprising in combination a carbon black furnace, a first conduit connected to the outlet of said carbon black furnace to receive therefrom effluent smoke containing carbon black particles, means in said conduit for reducing the temperature of the effluent smoke, a pair of conduits connected to said first conduit for receiving said smoke from said first conduit, the first of said pair of conduits having a plurality of metallic surfaces with a higher work function than the carbon black particles passed in contact therewith whereby a positive charge is imparted to said carbon black particles and a negative charge is imparted to said metallic surfaces, said first of the pair of conduits being electrically grounded whereby the negative charges on said metallic surfaces are continuously drawn off to avoid accumulation of said negative charges on said metallic surfaces, the second of said pair of conduits having a plurality of metallic surfaces with a lower work function than the carbon black particles passed in contact therewith whereby a negative charge is imparted to said carbon black particles and a positive charge is imparted to said metallic surface, said second of the pair of conduits being electrically grounded whereby the positive charges on said metallic surfaces are continuously drawn off to avoid accumulation of said positive charges on the metallic surfaces, means for oxidizing carbon black particles passing through one of said pair of conduits, and means for receiving and mixing the effluent smoke from said pair of conduits to agglomerate the carbon black particles therein with the size of the resulting agglomerates being dependent upon the magnitude of the charges carried by the respective carbon black particles from said pair of conduits.

References Cited in the file of this patent

UNITED STATES PATENTS

| | | |
|---|---|---|
| 2,114,682 | Gumaer | Apr. 19, 1938 |
| 2,148,064 | Fagerberg | Feb. 21, 1939 |
| 2,574,284 | Prochazka | Nov. 6, 1951 |
| 2,758,666 | Prentiss | Aug. 14, 1956 |

OTHER REFERENCES

Article: A High Voltage Direct Current Generator, October 15, 1932, issue of Physical Review, vol. 42, pages 298 to 304.